United States Patent
Van Der Meer et al.

(10) Patent No.: US 6,530,309 B2
(45) Date of Patent: Mar. 11, 2003

(54) APPARATUS FOR TOASTING BREAD

(75) Inventors: Sijtze Van Der Meer, Hoogeveen (NL); Albertus Peter Johannes Michels, Drachten (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/024,786

(22) Filed: Dec. 19, 2001

(65) Prior Publication Data

US 2002/0117057 A1 Aug. 29, 2002

(30) Foreign Application Priority Data

Dec. 22, 2000 (EP) .............................. 00204800

(51) Int. Cl.[7] ................................ A47J 37/08
(52) U.S. Cl. ........................ 99/331; 99/385; 99/389; 99/390; 99/391; 219/492; 219/521
(58) Field of Search ................... 99/326–331, 339, 99/340, 385–391, 393, 400; 219/385–387, 391–393, 520, 521, 492, 494, 497; 392/433, 373, 375, 337, 407; 426/241, 243, 466, 523

(56) References Cited

U.S. PATENT DOCUMENTS

| | | | | |
|---|---|---|---|---|
| 5,121,678 A | * | 6/1992 | Del Fresno | ................ 99/391 |
| 5,181,455 A | * | 1/1993 | Masel et al. | ................ 99/391 |
| 5,653,158 A | * | 8/1997 | Balandier et al. | ............. 99/327 |
| 5,664,483 A | * | 9/1997 | Yip | ............................ 99/391 |
| 5,802,957 A | * | 9/1998 | Wanat et al. | ................ 99/327 |
| 6,382,084 B2 | * | 5/2000 | Chan et al. | .................. 99/327 |
| 6,105,486 A | * | 8/2000 | Belknap et al. | ............... 99/389 |
| 6,123,012 A | * | 9/2000 | Hardin et al. | ................ 99/326 |
| 6,267,044 B1 | * | 7/2001 | Friel, Sr. | ..................... 99/327 |
| 6,343,543 B1 | * | 2/2002 | Belknap et al. | ............... 99/389 |

FOREIGN PATENT DOCUMENTS

FR 2707858 7/1993

* cited by examiner

*Primary Examiner*—Timothy F. Simone
(74) *Attorney, Agent, or Firm*—Ernestine C. Bartlett (57) ABSTRACT

An apparatus for toasting bread, includes a housing (2) with a slot (3) which leads into a toasting space (4). Heater elements (5) are arranged on both sides of this space which each cooperate with a reflector (7) for reflecting radiation in the direction of the toasting space. Grille elements (8) are located to center the bread in the toasting space. A bread support element (9) is provided for moving the bread up or down. The grille elements (8) and the support element (9) are moveable in a coordinated way. The grille elements (8) and/or the heater elements (5) are arranged on two pairs of arms (6) which are hinged (14) to a base part (1), while the support element (9) cooperates with a lever (19) which is also hinged (18) to the base part (1), the arms (6) and the lever (19) cooperating with openings (17) in a slide (10) which is movable in the base part (1).

14 Claims, 12 Drawing Sheets

APPARATUS FOR TOASTING BREAD

BACKGROUND OF THE INVENTION

The invention relates to an apparatus for toasting bread and the like, comprising a housing with a slot which issues into a toasting space in which products to be toasted can be accommodated, while heater elements are positioned on either side of said space, which heater elements each cooperate with a reflector positioned behind the respective heater element for reflecting radiation in the direction of the toasting space, and, also on either side of the toaster space, grille elements are positioned which can have an open position and a closed position for centering the products in the toasting space with respect to the heater elements, and a support element which can be moved up and down is positioned in the toasting space, means being present for moving the grille elements and the support element in a coordinated manner.

Apparatuses for toasting bread and the like are domestic appliances which have long been known. Toasting of the bread takes place in that radiation heat is supplied to the bread from heater elements which are positioned on either side of the toasting space. The heater elements are usually formed by an incandescent wire which is wound around an insulating plate, or by a glass-ceramic tube with a helically wound incandescent wire on the inside or outside thereof.

There has long been a wish to make the toasting process visible from the outside, so that the user can observe the browning of the product directly with his own eyes.

An apparatus for toasting of bread and the like of the kind mentioned in the opening paragraph is known from FR 2707858. A toaster for bread is presented in this document whose side walls and upper wall are manufactured from glass. A reflector of very small vertical dimensions is provided behind each of the heater elements so as to afford a better view of the product in the toasting space. This has the result that indeed the view of the product being toasted is hampered by the reflector in the central portion of the toasting space only and the rest of the product remains visible, but it has the disadvantage that the small vertical dimension of the reflector causes the toasting process to take place very unevenly. A further disadvantage of this known toaster is that the end walls of the apparatus are fully closed for the purpose of accommodating therein a motion mechanism and supply wiring for supplying current to the heater elements. A disadvantage of this is that the view of the product being toasted is partly obstructed thereby.

A further disadvantage of motion means for the grille elements and the product support projecting above the bottom plate is that cleaning of the interior of the apparatus is also hampered thereby.

OBJECTS AND SUMMARY OF THE INVENTION

The present invention has for its object to provide an apparatus of the kind mentioned in the opening paragraph in which said disadvantages are counteracted and an apparatus for toasting of products is obtained with a minimum amount of components positioned around the toasting space.

To achieve this object, an apparatus for toasting bread according to the present invention is characterized in that at least the grille elements and/or the heater elements are positioned on two pairs of arms which are supported in a base part with hinging possibility relative to one another, said arms cooperating with recesses in a slide which can be moved back and forth in the base part. In a further embodiment, the support part also cooperates with at least one lever which is supported with hinging possibility in the base part and which in its turn also cooperates with a recess in said slide. In a favorable embodiment, the hinge pins of said arms are journaled in the base part above the slide, and the portion of each arm situated below the associated hinge pin is coupled via a lever to a guide pin which enters an accompanying slot of the slide.

Similarly, the lever for moving the support element may also be pivotably supported about a hinge pin which is situated above the slide, while the lower portion of the lever enters a recess of the slide and the upper portion of the lever is provided with a pin which is guided in a slot of the support element.

According to the invention, the recesses in the slide cooperating with said arms and levers are positioned and dimensioned with respect to one another such that the support element occupies its uppermost position in the open position of the arms, and vice versa.

An apparatus is obtained in this manner in which a reciprocal movement of a slide accommodated in a base part causes said arms and the support element to perform a coordinated motion program in which the motion mechanism is in fact entirely situated below the base plate, while only those elements which are absolutely necessary for a good operation of the apparatus are present in the toasting space.

The apparatus thus has a minimum number of components which may act as dirt traps, so that they can also be very easily cleaned.

This cleaning may be further facilitated in that a removable cloche is placed on the base part, surrounding the toasting space and the components present therein, which cloche can be taken off for cleaning of the apparatus.

To make the toasting process in the toasting space clearly visible, said cloche may be manufactured from a transparent material, as will be explained in more detail further below.

Said slide may be moved back and forth by hand, if so desired, but in a further embodiment of the invention an electric drive motor for the slide is accommodated in the base part, which motor is provided with a threaded spindle which cooperates with a nut coupled to the slide.

The slide can be moved back and forth in this manner through a suitable operation of the electric motor. This obviously enhances the ease of operation of the apparatus.

In a further embodiment, the arms supporting the heater elements and the grille elements are manufactured from an electrically conducting material so that they can serve at the same time for supplying current to the heater elements.

To achieve a good visibility of the product to be toasted in the toasting space, the reflectors, which each extend over substantially the entire side wall of the toasting space, are each manufactured from a transparent material.

Furthermore, the housing of the apparatus may be formed by a cloche which is manufactured from a transparent material on all sides, which surrounds the toasting space, and which is detachably mounted on a base plate. The reflectors and/or the cloche may be manufactured from glass in this case and may be provided on their inner sides with a transparent infrared-reflecting coating of a metal or metal oxide such as, preferably, tin oxide.

The reflectors may then have the shape of concave mirrors, the rod-shaped heater elements being placed in the focal lines thereof.

If so desired, the reflectors together with the grille elements for centering the products to be toasted may be fastened with some tilting possibility on the heater elements by means of a snap or suspension connection.

It may be concluded from the above that the invention provides an apparatus for toasting bread and the like which comprises a minimum number of components positioned in and around the toasting space, so that cleaning of the interior of the apparatus can take place with comparatively little difficulty, especially if the apparatus is further provided with a detachable cloche as its housing, which cloche may in particular be manufactured from glass, so that the toasting process taking place in the toasting space is clearly visible to the user.

BRIEF DESCRIPTION OF THE DRAWING

The invention will be explained in more detail below with reference to the drawing in which an embodiment of an apparatus made of glass and designed for toasting bread is shown.

DESCRIPTION OF THE PREFERRED EMBODIMENT (S)

Figure 1:
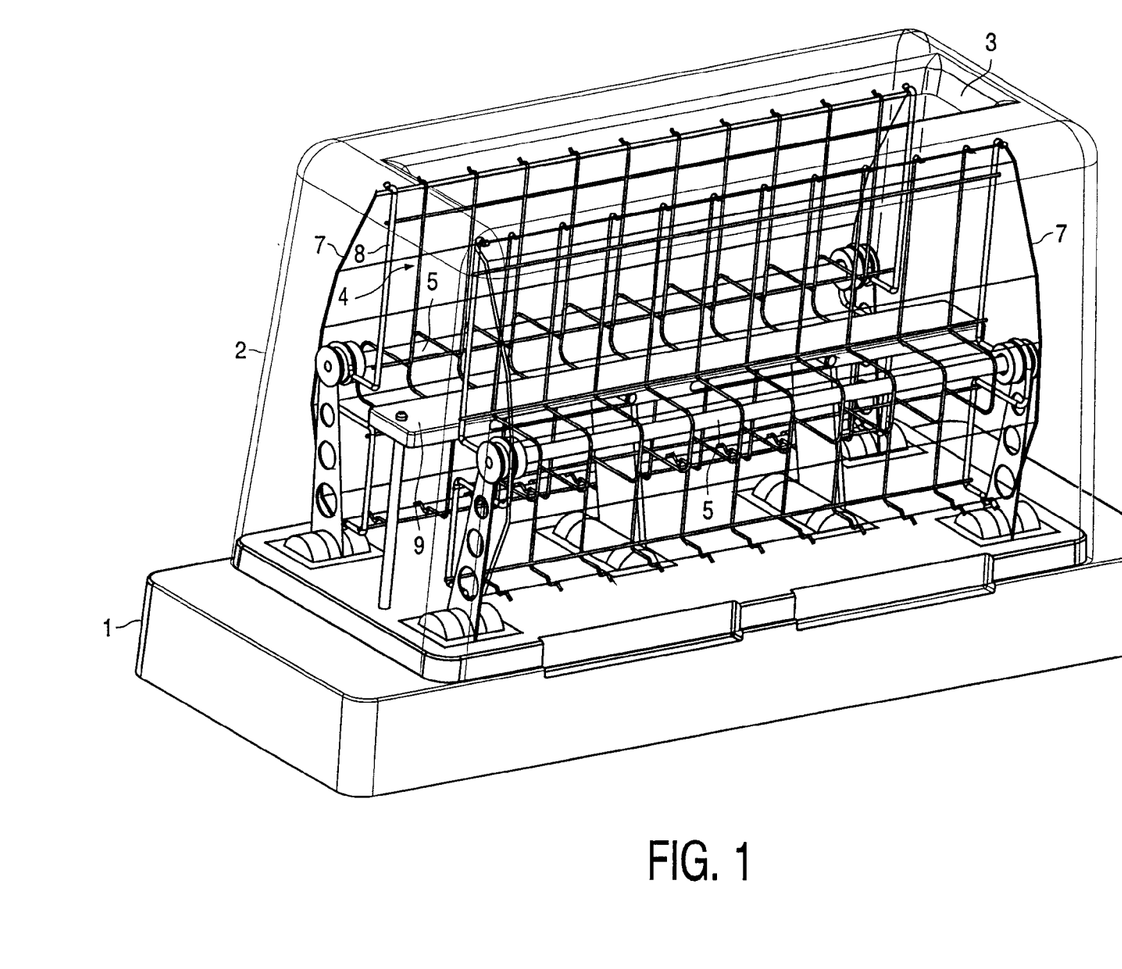
FIG. 1 is a diagrammatic perspective view not true to scale of a toaster for bread according to the invention in the assembled state.
Figure 2:
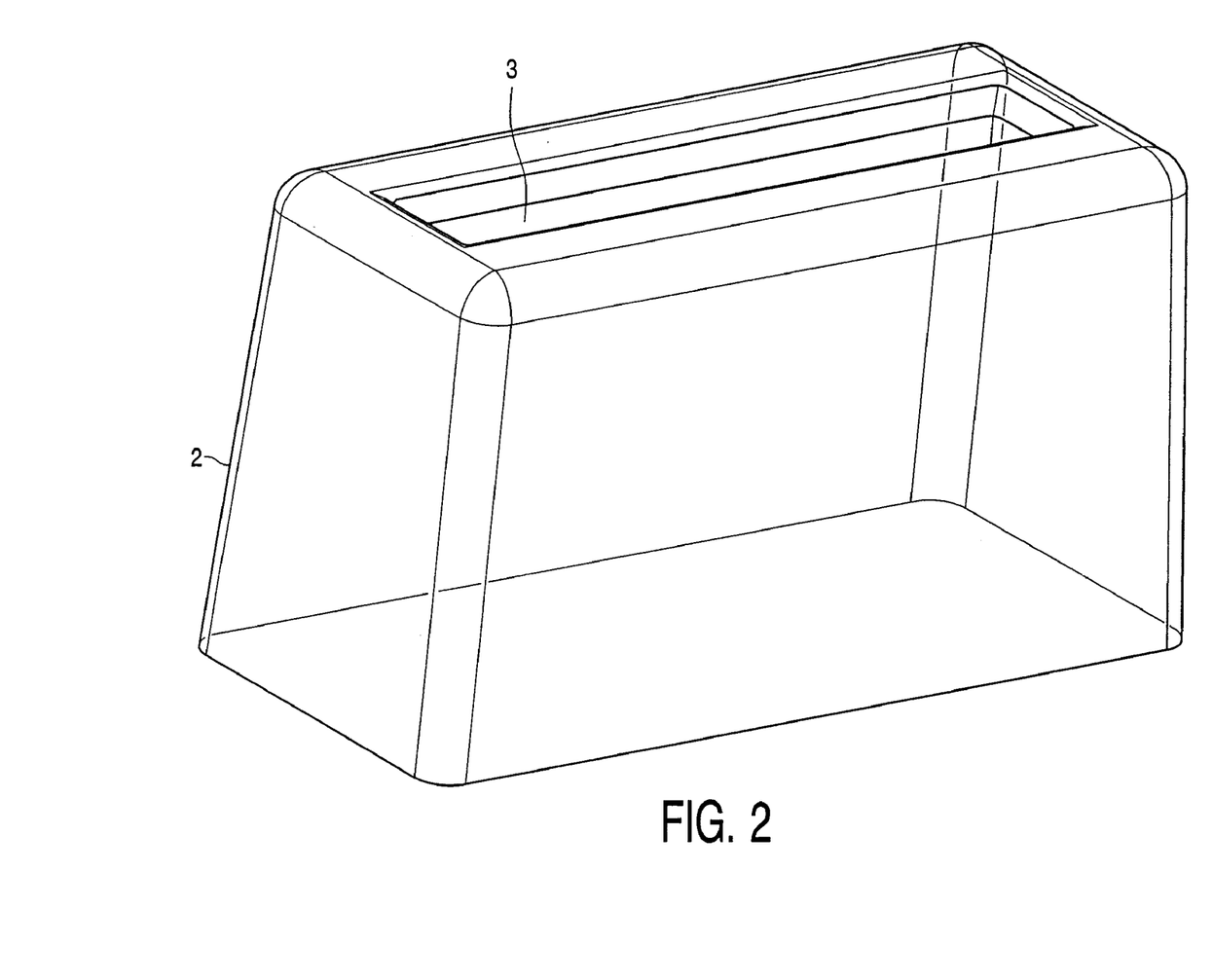
FIG. 2 is a diagrammatic perspective view not true to scale of a glass cloche which forms the upper part of the housing of the toaster of FIG. 1.
Figure 6:
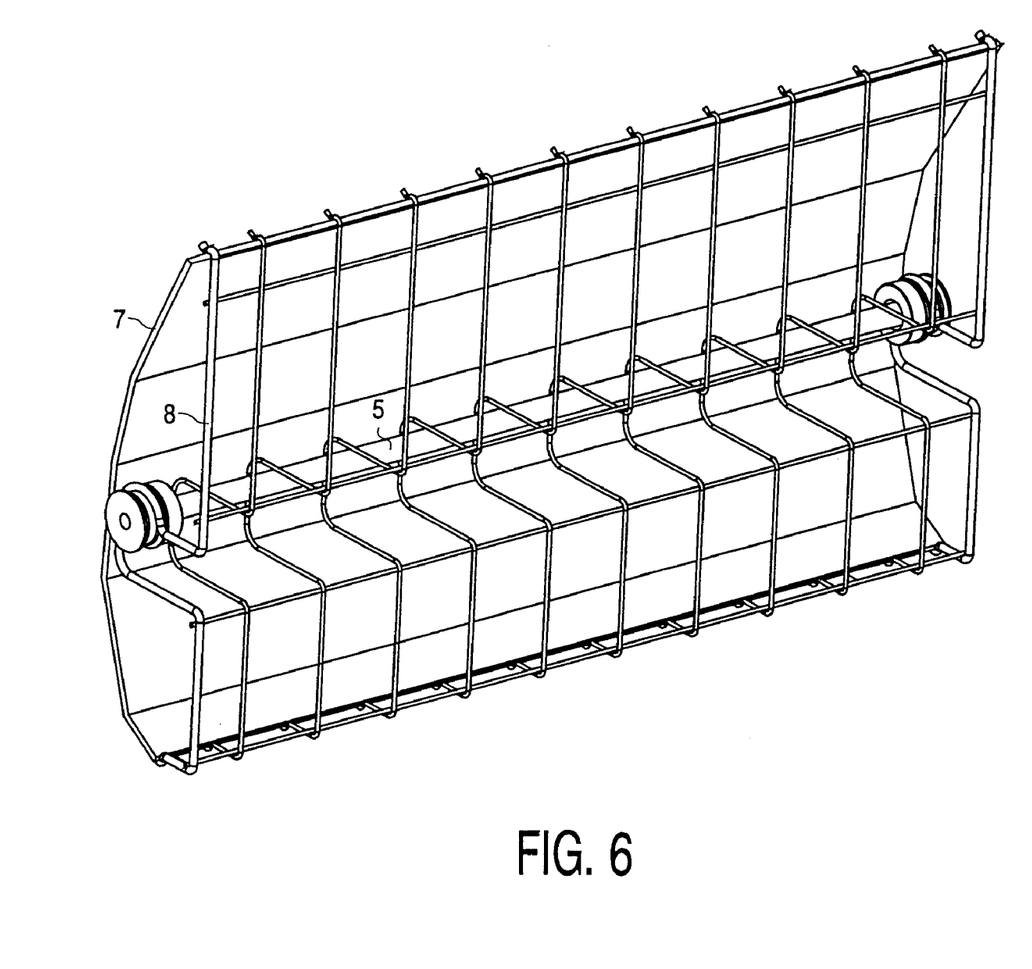
FIG. 6 diagrammatically shows an example of a reflector with grille elements which are snapped home onto a rod-shaped heater element, again not true to scale.

In FIG. 1, reference numeral 1 denotes a base part of a toaster for bread. A glass cloche 2 is provided on the base part 1 and has at its upper side an entry slot 3 which affords access to a toasting space 4. Two rod-shaped heater elements 5 are provided on either side of the toasting space, each formed in this case by a glass-ceramic tube in which an incandescent wire is accommodated in a spiraling shape. The rod-shaped heater elements 5 are supported by arms 6 which are hinged in the base part 1, as will be explained in more detail further below with reference to FIG. 4. The arms 6 are manufactured from an electrically conducting material, so that further current supply wires for the heater elements 5 are not necessary. As is also shown in FIG. 6, an assembly of a reflector 7 and grille elements 8 is snapped home onto each of the heater elements 5 such that this assembly can pivot somewhat about the relevant heater element 5. The reflectors may alternatively be detachably suspended from the heater elements, together with the grille elements, instead of being fastened by a snap joint. Each of the reflectors 7 is manufactured from glass and is provided on its inside with a coating consisting of a thin, transparent layer of a metal or metal oxide, preferably tin oxide.

The inside wall of the cloche 2, which forms the housing of the toaster, is also provided with such an infrared-reflecting coating of tin oxide. A toaster is obtained in this manner in which the browning process of the products introduced into the toasting space 4 through the entry slot 3 can be very clearly observed from the outside, because in fact the toasting space 4 is entirely surrounded by transparent glass walls. This enhances the ease of use of the toaster to a high degree, because it is now directly visible whether the toasting process has progressed to the point where the user finds its desirable to interrupt it.

The outer surface of the glass cloche 2 will remain at an acceptable temperature here because the infrared radiation of the heater elements 5 will be reflected back at least for a major portion in the direction of the product present in the toasting space by the coatings on both the reflectors and the inside of the cloche 2, so that said coated glass walls will be heated to a low degree only.

The small thickness of said coatings renders them quite transparent, so that the toasting process can be observed from all sides of the toaster. The number of parts projecting above the base plate 1 is reduced to a minimum here. The grille elements 8 are journaled in the base part with rotation possibility by means of hinges 14. The movement towards one another and away from one another of the grille elements and the up-and-down movement of the bread support 9 along guide rods 9a is achieved fully by operational elements accommodated in the base plate 1.

Figure 3:
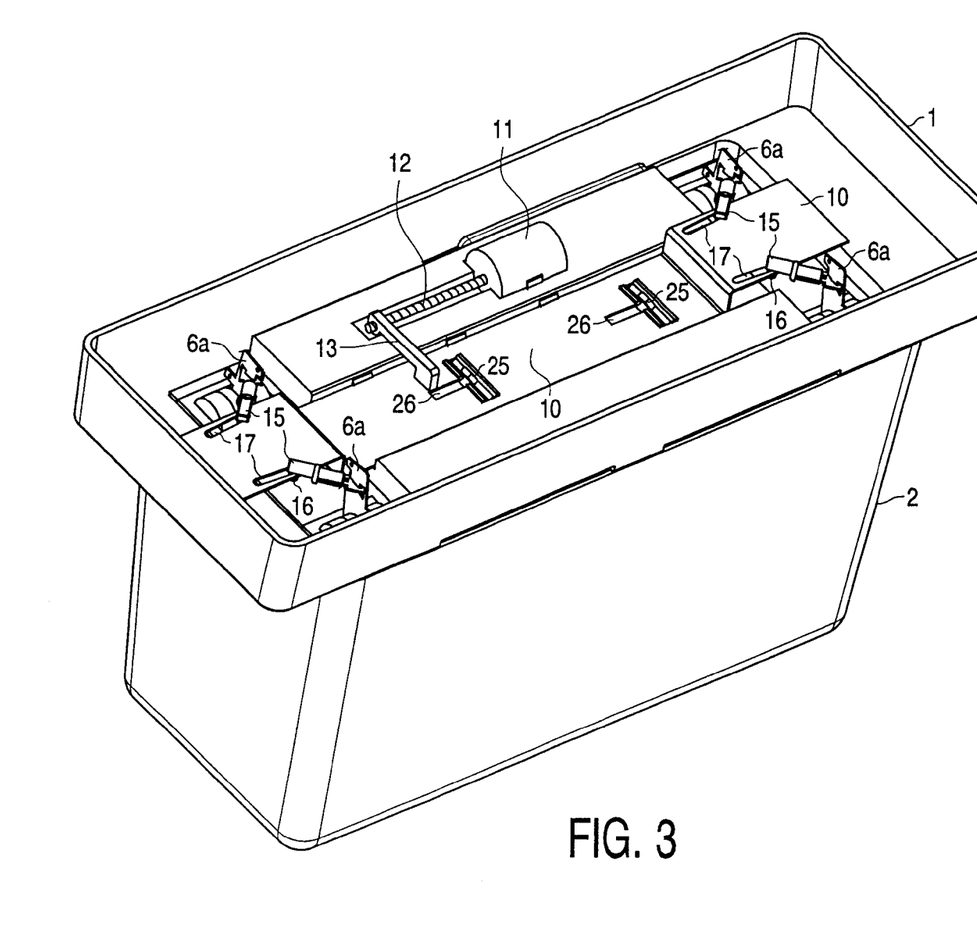
FIG. 3 is a diagrammatic elevation not true to scale of the base of the toaster of FIG. 1 in an open state.
Figure 4:
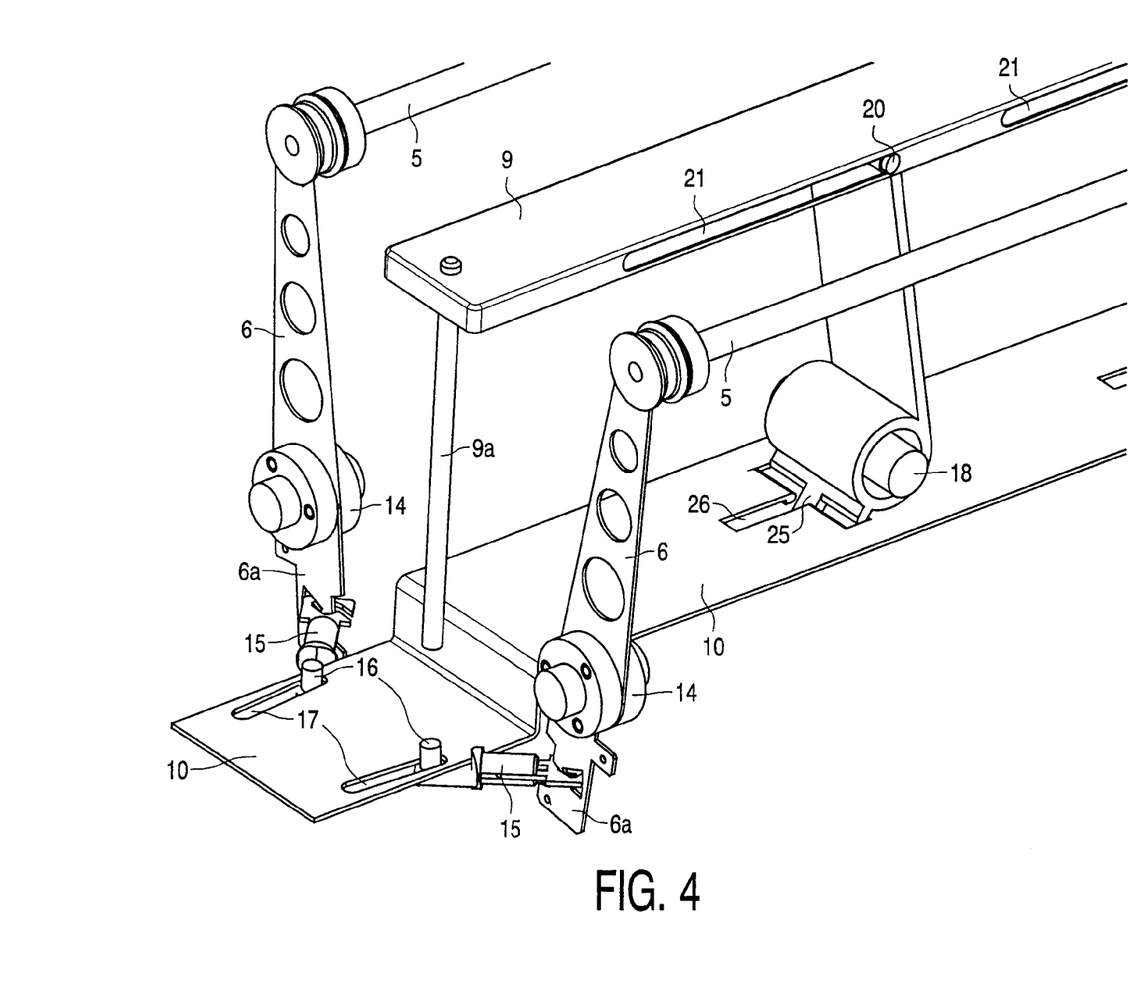
FIG. 4 shows a detail of the operating mechanism of the toaster of FIG. 1.
Figure 5A:
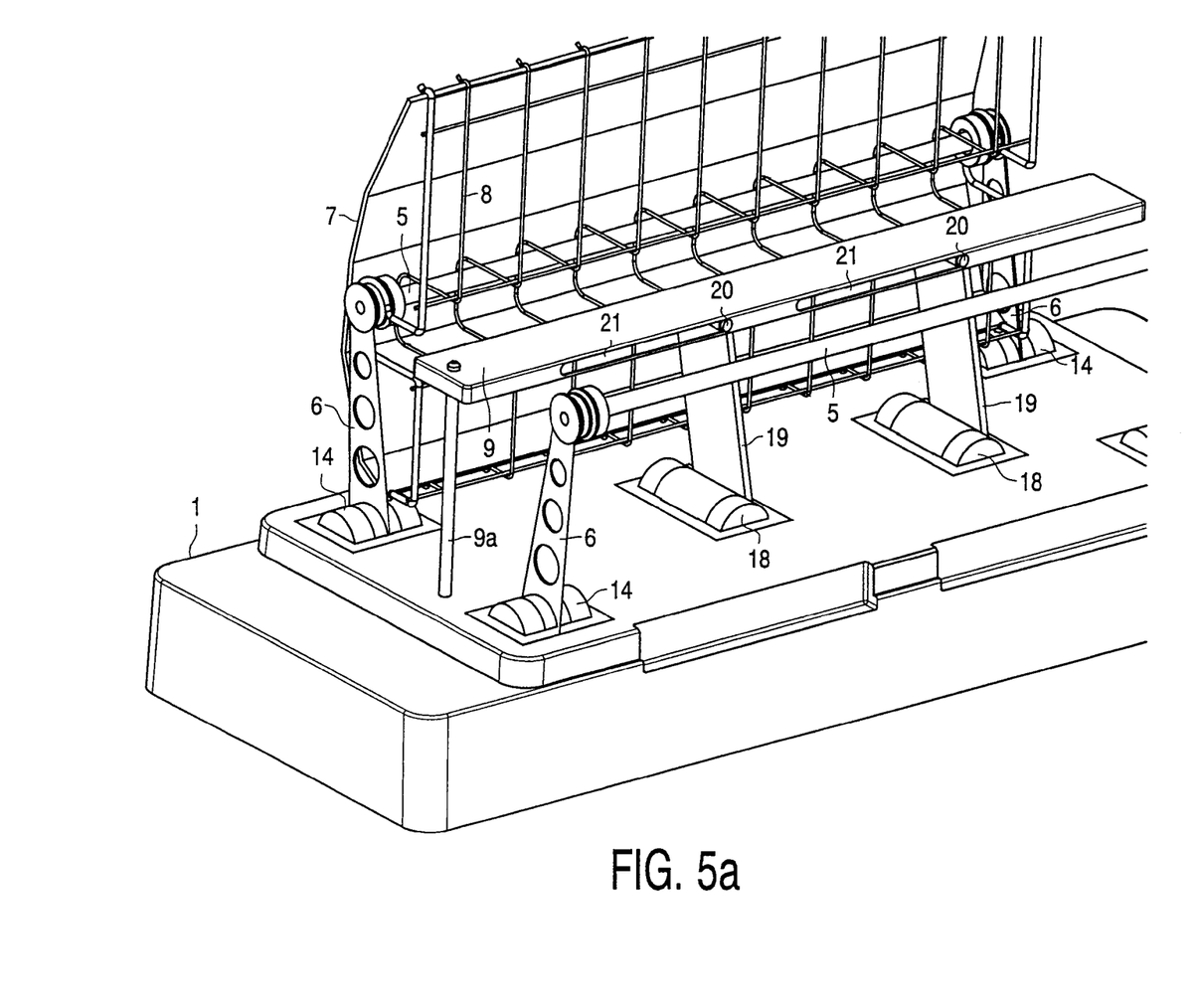
FIGS. 5a, 5b, 5c diagrammatically show three positions of the operating mechanism of a toaster of FIG. 1 not true to scale.
Figure 5B:
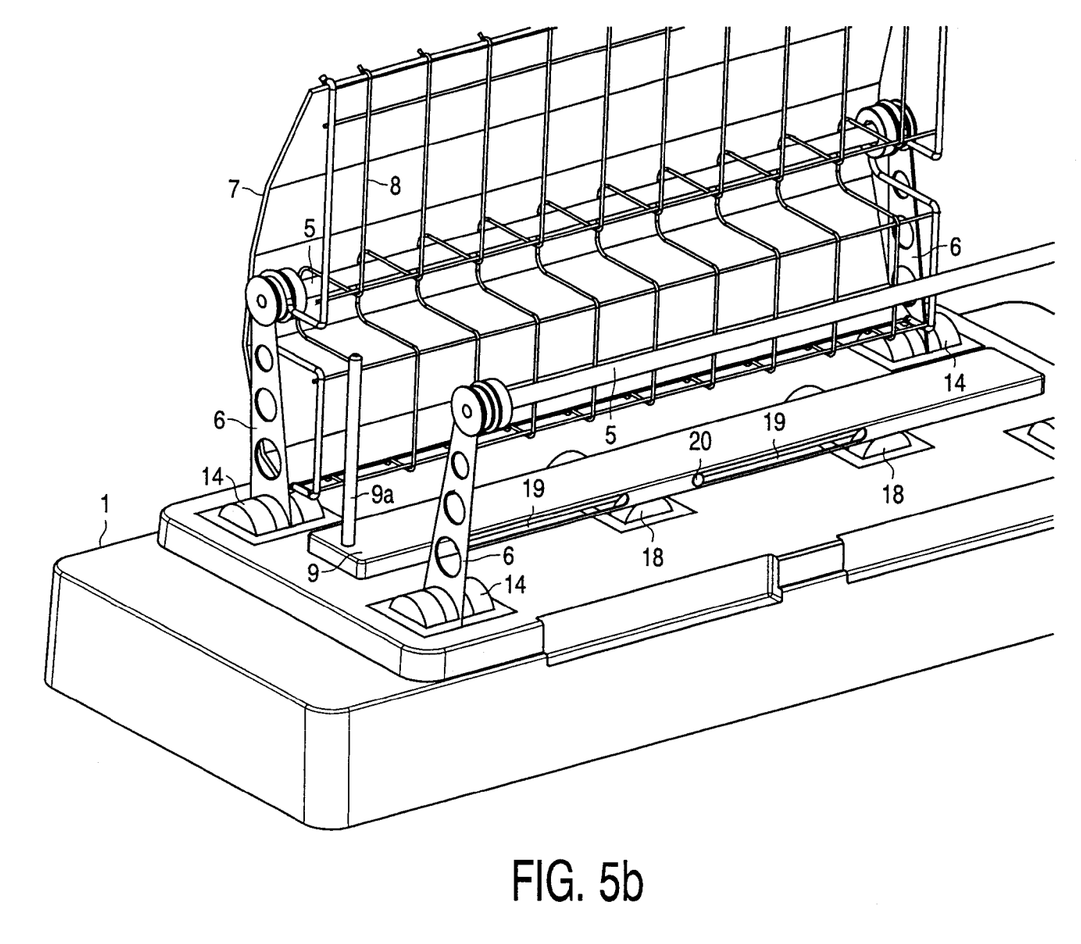
Figure 5C:
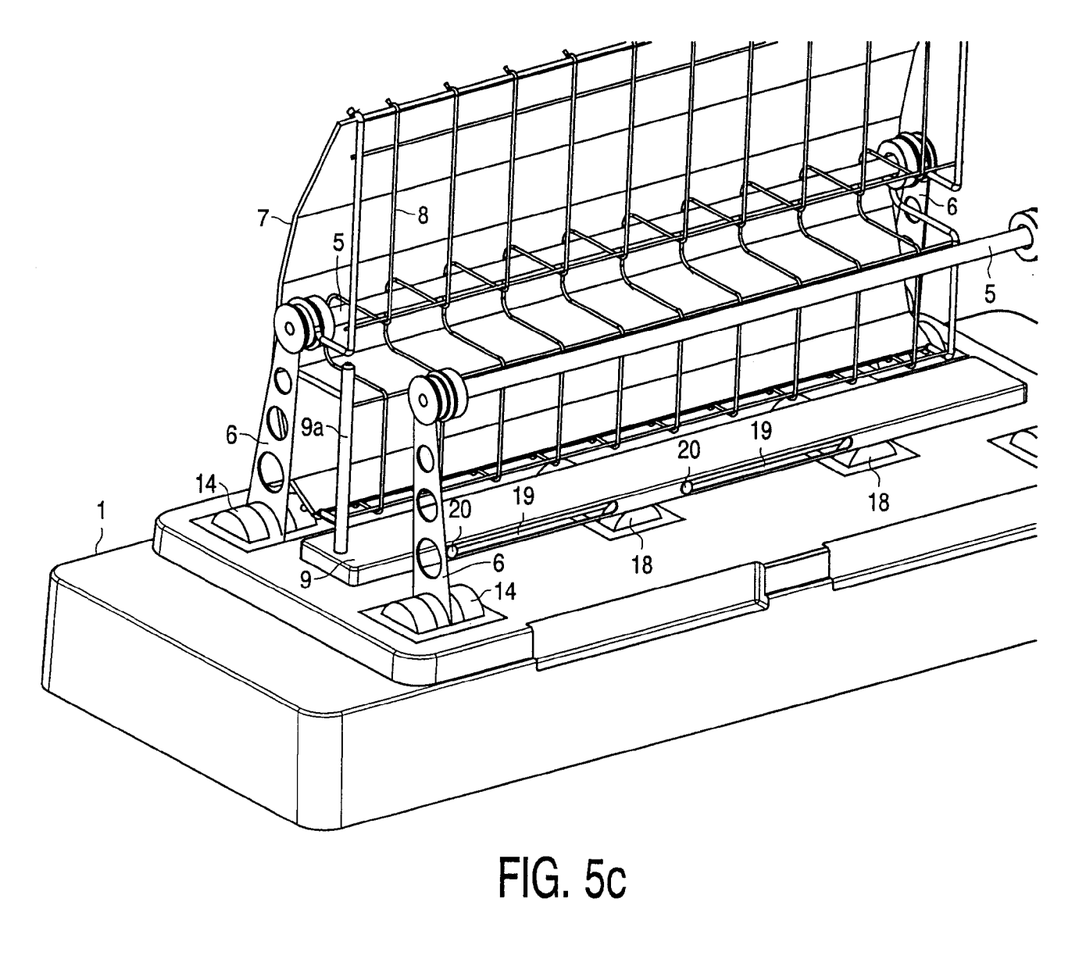

To clarify this, FIG. 3 shows the base plate 1 in an open state, viewed from the bottom of the toaster, from which it is apparent that a reciprocating slide 10 is present in the base plate 1, which slide can be moved back and forth by a motor 11 which is provided with a threaded spindle 12 which cooperates with an arm 13 connected to the slide 10. The arms 6 carrying the heater elements 5 are connected to the base part 1 by means of hinges 14, as is shown in the detail of FIG. 4. The hinges 14 are situated above the slide 10. The portion 6a of each arm 6 situated below the hinges 14 is coupled to a slot 17 in the slide 10 by means of telescopic rods 15 and a stud 16 provided on each of the rods 15. The base part 1 is further provided with two hinges 18 which are each provided with a lever arm 19 with studs 20, the latter being each guided in a slot 21 in the bread support 9. The portion 25 of the lever 19 situated below the hinge 18 enters a recess 26 of the slide 10. FIG. 5a depicts the situation in which the bread support 9 is in its uppermost position, i.e. in a position in which the bread is placed on the bread support through the entry slot 3 in the cloche 2. The grille elements 8, the heater elements 5, and the reflectors 7 are in their open position. The heater element is not switched on, as is usual. The recesses 17 and 26 in the slide 10 are dimensioned such that the motor 11, when started, will set the slide 10 in motion so that in a first movement phase the bread support 9 moves down into its lowermost position, i.e. an intermediate slide position, as is shown in FIG. 5b. The lever arms 6 do not yet move, and the grille elements 8, the heater elements 5, and the reflectors 7 are still in their open position. When the slide 10 moves further, the lever arms 6 start rotating, so that the grille elements 8, the heater elements 5, and the reflectors 7 move towards one another over a small distance, whereby the bread is clamped in between the grille elements 8 and is centered at the same time. It is only in this position, a closed position shown in FIG. 5c, that the heater elements 5 are switched on.

A toaster for bread is obtained in this manner in which no or substantially no components are present around the toasting space which hamper the view of that which takes place inside the toasting space, while practically all operational elements are accommodated in a base part, which may be of a comparatively flat construction because the operation is effected mainly by means of a horizontally moving slide 10. The cloche 2 may be simply lifted from the base part 1 for the purpose of cleaning the apparatus. When the cloche is taken off, the voltage applied to the apparatus will be cut off on two sides (both the neutral lead and the live lead). Cleaning is further facilitated in that both the reflectors and the grille elements are detachably mounted. The reflectors may be taken off the heater elements, possibly together with the grille elements, whereupon the toaster becomes easily accessible for cleaning purposes.

Figure 7:
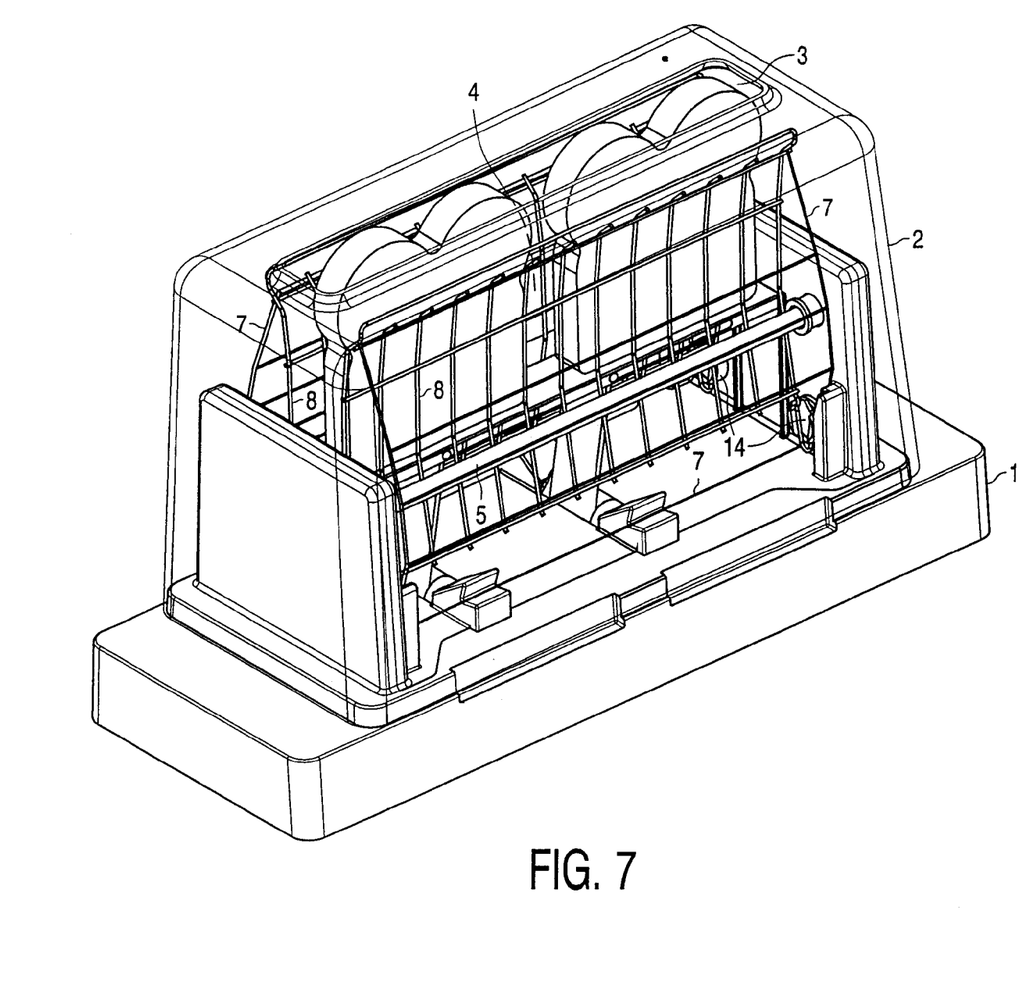
FIG. 7 is a diagrammatic perspective open view of an alternative embodiment of the toaster according to the invention.
Figure 8A:
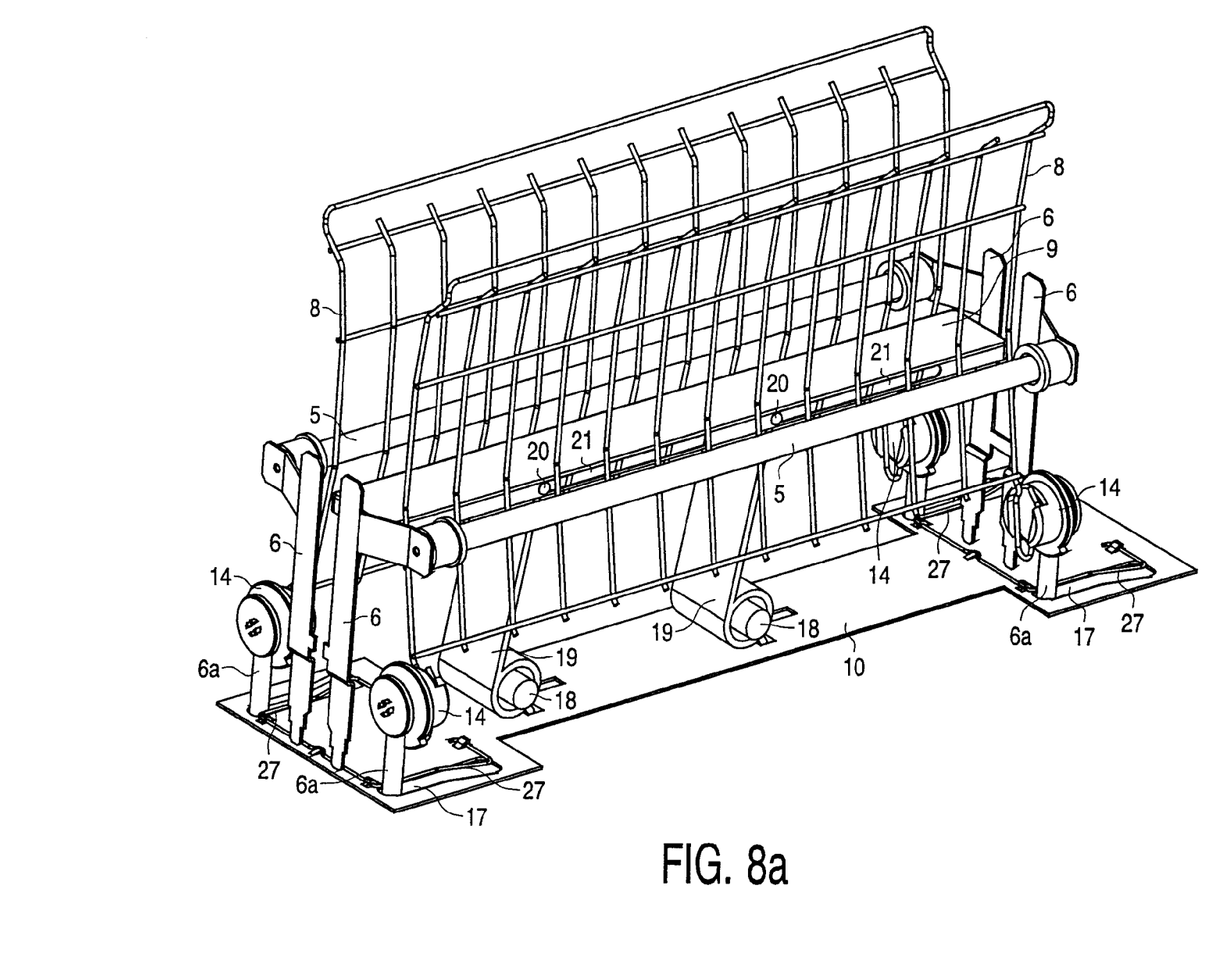
FIGS. 8a and 8b diagrammatically show the interior mechanism of the toaster of FIG. 7.
Figure 8B:
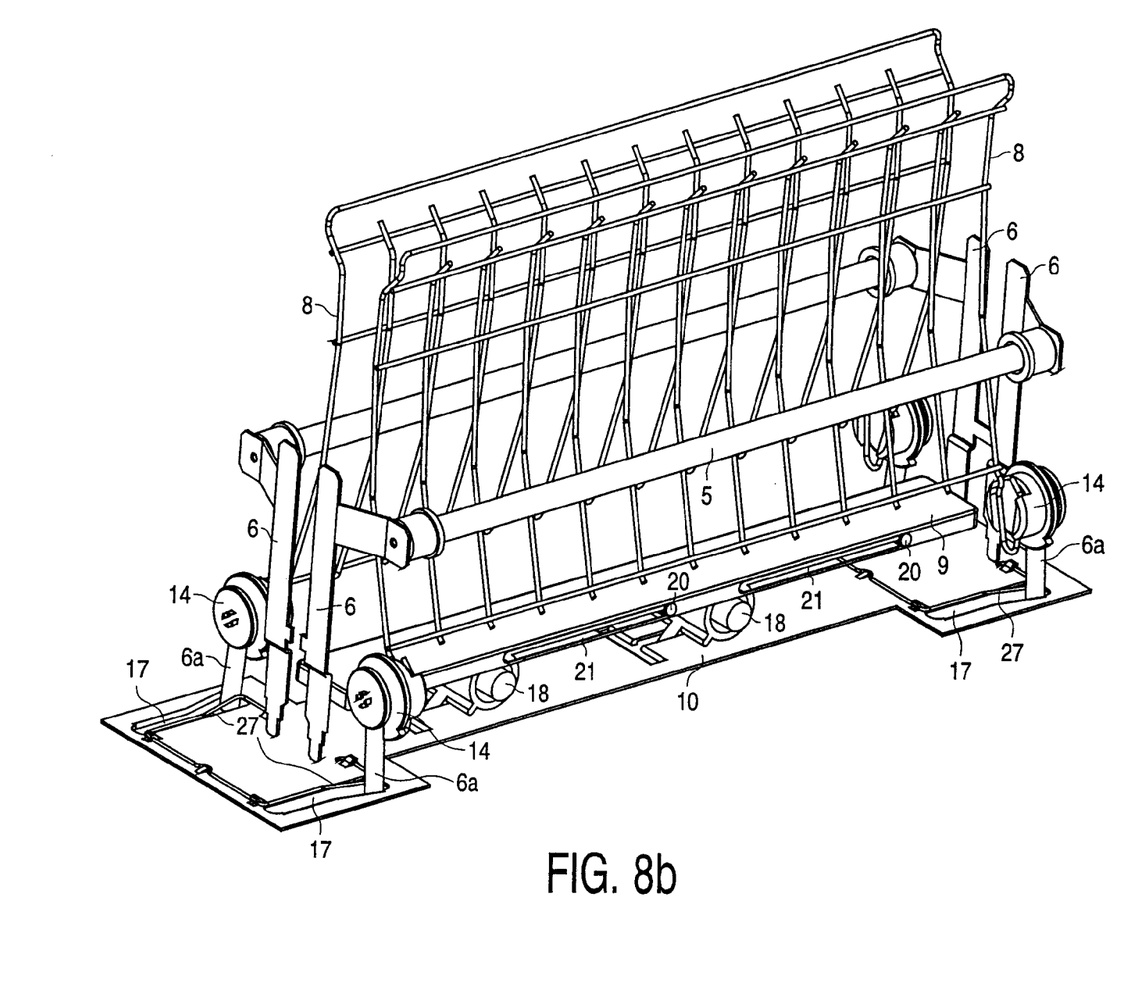
Figure 9:
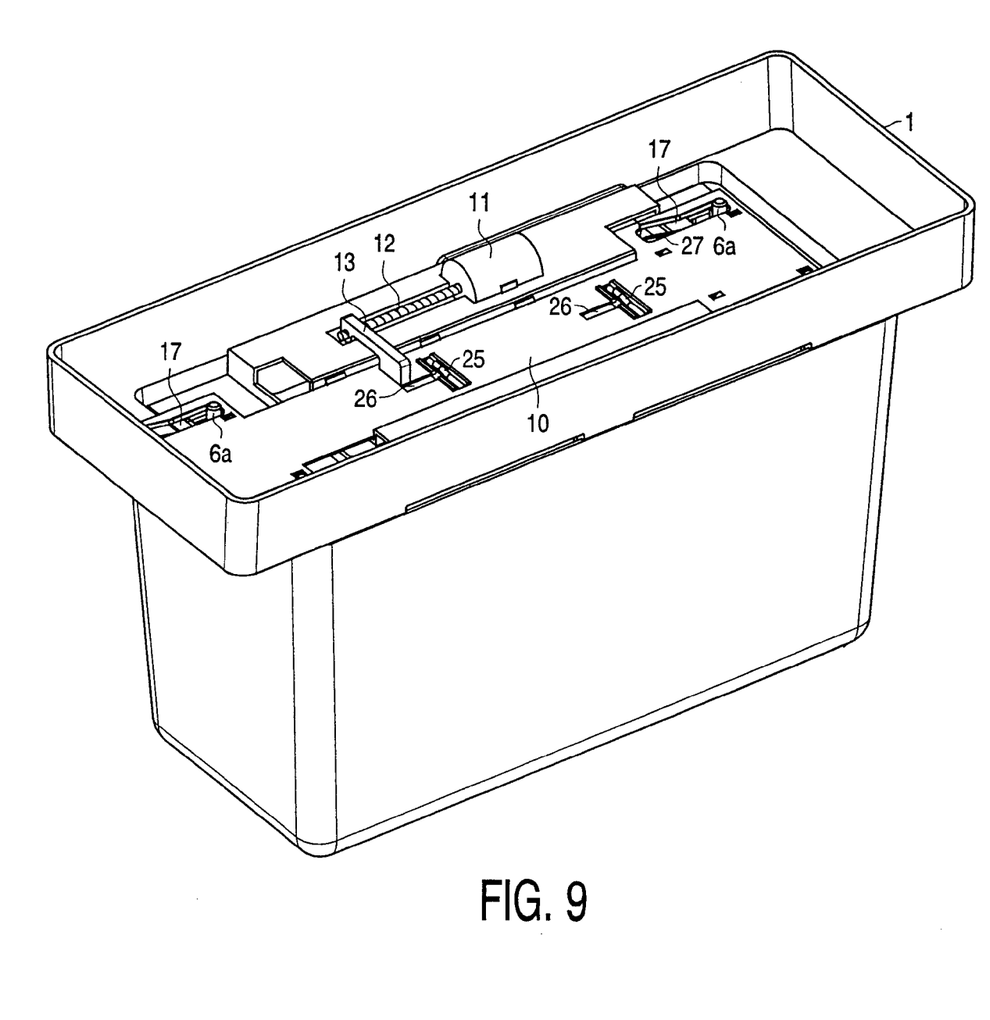
FIG. 9 diagrammatically shows the base part of the toaster of FIG. 7 without cover plate.

FIGS. 7 to 9 show an alternative embodiment of a toaster for bread according to the invention, in which corresponding components have been given the same reference numerals as in the preceding Figures. As FIG. 7 shows, this toaster is again provided with a base part 1 on which a glass cloche 2 is placed, which cloche is provided with a slot 3 through which slices of bread can be introduced into a toasting space 4. Two heater elements 5 are again positioned on either side of the toasting space, which elements are each formed in this case by a ceramic tube with a helically coiled incandescent wire accommodated therein. The rod-shaped heater elements 5 are supported by arms 6 which are fixedly fastened in a raised wall portion of the base part 1 in this case. The arms 6 are manufactured from an electrically conducting material, so that further current supply wires for the heater elements 5 are not necessary. Reflectors 7 are positioned behind the heater elements 5, and grille elements 8 are present between the heater elements 5 and the toasting space 4. The reflectors 7 are fixedly positioned and manufactured from glass with a coating on their inner sides, which coating comprises a thin, transparent layer of a metal oxide, preferably tin oxide.

The inside wall of the cloche 2 forming the housing of the toaster is also provided with such an infrared-reflecting tin oxide coating. A toaster is obtained in this manner in which the browning process of the product introduced into the toasting space 4 through the entry slot 3 can be very clearly observed from the outside because in fact the toasting space 4 is entirely surrounded by transparent glass walls. This enhances the ease of operation of the toaster to a high degree because it can now be directly viewed whether the toasting process has progressed to the point where the user considers it desirable to interrupt it.

The outside of the glass cloche 2 will remain at an acceptable temperature here because the infrared radiation of the heater elements 5 will be reflected back at least substantially in the direction of the product present in the toasting space by the coatings on both the reflectors and the inside of the cloche 2, so that said coated glass walls will be heated to a low degree only.

The small thickness of said coatings renders them quite transparent, so that the toasting process can be observed from all sides of the toaster. The number of components projecting above the base plate 1 is reduced to a minimum here. The grille elements 8 are rotatably journaled in the base part 1 (see also FIGS. 8*a, b*) by means of hinges 14. The movements towards one another and away from one another of the grille elements 8 and the up and down movement of the bread support 9 are fully carried out by operational elements accommodated in the base plate 1.

To clarify this, FIG. 10 shows the base plate 1 in an open state and viewed from the bottom, from which it is apparent that a reciprocating slide 10 is present in the base plate 1, which slide can be moved back and forth by a motor 11 provided with a threaded spindle 12 which cooperates with an arm 13 connected to the slide 10. The grille elements 8 are connected to the base part 1 via hinges 14, as is shown in FIGS. 8*a*, 8*b*. The portion 6*a* of each arm 6 situated below the hinges is guided in a profiled slot 17 in the slide 10. The inside of this slot is formed by a wire spring 17 which gives the construction a sufficient flexibility for accommodating bread slices of different thicknesses. This principle of operation may also be applied in the embodiment discussed further above, in which the heater elements and the reflectors also move along with the grille elements.

The base part is further provided with two hinges 18 which are each provided with a lever arm 19 with studs 20 which are each guided in a slot 21 of the bread support 9, fully in conformity with the embodiment discussed further above. When the slide 10 is moved back and forth, the grille elements and the bread support 9 will now occupy an open position as shown in FIG. 8*a*, or a closed position as shown in FIG. 8*b*.

A toaster for bread is obtained in this manner in which no or hardly any components are present around the toasting space which hamper the view of that which takes place inside the toasting space, while substantially all operational elements are accommodated in a base part which may be of a comparatively flat construction, because the operation is effected substantially by means of a horizontally moving slide 10. The cloche may be simply lifted from the base part for the purpose of cleaning the apparatus. When the cloche is lifted, the voltage applied to the apparatus will be cut off on both sides (both the neutral lead and the live lead). Cleaning is further facilitated in that both the reflectors and the grille elements are detachably mounted.

What is claimed is:

1. An apparatus for toasting products, comprising:
   a housing with a slot which issues into a toasting space in which products to be toasted can be accommodated,
   at least one heater element positioned on a side of said toasting space,
   a reflector positioned behind the heater element for reflecting radiation from the heater element in the direction of the toasting space,
   grille elements positioned on either side of the toaster space, which grille elements have an open position and a closed position for centering products in the toasting space with respect to the heater elements,
   a support element positioned in the toasting space, the support moveable up and down, and
   means for moving the grille elements and the support element in a coordinated manner,
   characterized in that a base part, a slide moveable back and forth in the base part and two pairs of arms are provided, the slide having a pair of recesses, and at least the grille elements and/or the heater elements are positioned on the two pairs of arms, said arms cooperating with the recesses in the slide.

2. An apparatus as claimed in claim 1, characterized in that the support part also cooperates with at least one lever which is supported with hinging possibility in the base part, and said at least one lever cooperates with recesses in said slide which is movable back and forth in the base part.

3. An apparatus as claimed in claim 1, characterized in that the hinge pins of said arms are journaled in the base part above the slide, and the portion of each arm situated below the associated hinge pin is coupled via a lever to a guide pin which enters a matching slot of the slide.

4. An apparatus as claimed in claim 1, characterized in that the lever for moving the support element is also rotatably supported about a hinge pin which is situated above the slide, while the lower portion of the lever enters a recess of the slide and the upper portion of the lever is provided with a pin which is guided in a slot of the support element.

5. An apparatus as claimed in claim 3, characterized in that the recesses in the slide cooperating with said arms and levers are positioned and dimensioned with respect to one another such that the support element occupies its uppermost position in the open position of the arms, and vice versa.

6. An apparatus as claimed in claim 5, characterized in that an electric drive motor for the slide is accommodated in the base part, which motor is provided with a threaded spindle which cooperates with a nut coupled to the slide.

7. An apparatus as claimed in claim 6, characterized in that the arms supporting the heater elements and the grille elements are manufactured from an electrically conducting material so that they can serve at the same time for supplying current to the heater elements.

8. An apparatus as claimed in claim 6, characterized in that the reflectors each extend over substantially the entire side wall of the toasting space and are each manufactured from a transparent material.

9. An apparatus as claimed in claim 8, characterized in that the housing is formed by a cloche which is manufactured from a transparent material on all sides, which surrounds the toasting space, and which is detachably mounted on a base plate.

10. An apparatus as claimed in claim 8, characterized in that the reflectors and/or the cloche are manufactured from glass.

11. An apparatus as claimed in claim 8, characterized in that the reflectors and/or the inside wall of the cloche are provided with a transparent, infrared-reflecting coating.

12. An apparatus as claimed in claim 11, characterized in that the coating is formed by a transparent layer of a metal oxide, preferably tin oxide.

13. An apparatus as claimed in claim 8, characterized in that the reflectors each have the shape of a concave mirror, and the rod-shaped heater elements are placed in the focal lines thereof.

14. An apparatus as claimed in claim 13, characterized in that the reflectors together with the grille elements for centering the products to be toasted are fastened with some tilting possibility on the heater elements by means of a snap or suspension connection.

* * * * *